United States Patent
Zimmer et al.

(10) Patent No.: US 8,721,243 B2
(45) Date of Patent: May 13, 2014

(54) ANCHOR WITH STRUCTURED CLAMPING SECTION

(76) Inventors: Günther Zimmer, Rhelnau (DE); Martin Zimmer, Rhelnau (DE)

(*) Notice: Subject to any disclaimer, the term of this patent is extended or adjusted under 35 U.S.C. 154(b) by 0 days.

(21) Appl. No.: 12/799,510

(22) Filed: Apr. 26, 2010

(65) Prior Publication Data

US 2010/0281817 A1  Nov. 11, 2010

Related U.S. Application Data

(63) Continuation-in-part of application No. PCT/DE2008/001730, filed on Oct. 24, 2008.

(30) Foreign Application Priority Data

Oct. 26, 2007 (DE) .......................... 10 2007 051 629

(51) Int. Cl.
*F16B 13/12* (2006.01)
(52) U.S. Cl.
USPC ........................................ 411/80.1; 411/180
(58) Field of Classification Search
USPC ........ 411/80.1, 103, 144, 172, 173, 179–183, 411/188, 189
See application file for complete search history.

(56) References Cited

U.S. PATENT DOCUMENTS

| | | | | |
|---|---|---|---|---|
| 2,822,014 A * | 2/1958 | Cummaro | ...................... | 411/109 |
| 2,984,279 A * | 5/1961 | Rosan | ........................... | 411/178 |
| 3,074,292 A * | 1/1963 | Polmon | ........................... | 74/553 |
| 3,215,183 A * | 11/1965 | Dietlein | ........................ | 411/109 |
| 3,232,163 A * | 2/1966 | Croessant | .................... | 411/80.1 |
| 3,259,161 A * | 7/1966 | Rosan | ........................... | 411/109 |
| 3,281,173 A * | 10/1966 | Rosan | ........................... | 403/242 |
| 3,498,353 A * | 3/1970 | Barry | ............................ | 411/180 |
| 4,371,300 A * | 2/1983 | Ringham | ........................ | 411/41 |
| 4,568,228 A * | 2/1986 | Rosan, Jr. | ..................... | 411/178 |
| 4,717,612 A | 1/1988 | Shackelford | | |
| 4,729,705 A * | 3/1988 | Higgins | ........................ | 411/82 |
| D298,605 S * | 11/1988 | Colgan et al. | ................. | D8/382 |
| 4,836,729 A * | 6/1989 | Bisping et al. | ............... | 411/82.1 |
| 5,435,678 A * | 7/1995 | Stencel | ......................... | 411/178 |
| 6,623,492 B1 * | 9/2003 | Berube et al. | ................ | 606/151 |
| D577,285 S * | 9/2008 | Gaudron | ........................ | D8/385 |
| 7,594,788 B2 * | 9/2009 | Maloney | ........................ | 411/180 |
| 7,682,116 B2 * | 3/2010 | Cabrele et al. | ............... | 411/80.5 |

* cited by examiner

*Primary Examiner* — Gary Estremsky
(74) *Attorney, Agent, or Firm* — Klaus J. Bach

(57) ABSTRACT

In an anchor for installation into a lightweight construction panel including at least a cover plate, wherein the anchor includes a radial clamping section for firm engagement with the cover plate when installed in a bore formed into the construction panel, the radial clamping section comprises an upper zone provided with axial grooves and a lower zone having transversely extending grooves both in engagement with the walls of the bore in the area of the cover plate.

8 Claims, 2 Drawing Sheets

ANCHOR WITH STRUCTURED CLAMPING SECTION

This is a Continuation-In-Part application of pending international patent application PCT/DE2008/001730 filed Oct. 24, 2008 and claiming the priority of German Patent application 10 2007 051 629.2 filed Oct. 26, 2007.

BACKGROUND OF THE INVENTION

The invention resides in an anchor for attachment to a light-weight construction panel which includes a support core with at least one cover plate, the anchor having a structured engagement section engaging the at least one cover plate of the light-weight construction panel by radial clamping.

Construction panels with support cores are often called sandwich panels, honeycomb panels or lightweight panels. All types of panels used in furniture construction have rigid cover plates consisting of thin particle boards, medium-, or high-density fiber plates, plywood or hard fiber plates. The sandwich panels generally include a center layer, that is, a support core for example of polyurethane foam or polysterol. In the honeycomb panels, often corrugated web inserts or so-called expanded honeycomb sheets are used as intermediate layers. Most lightweight construction panels have a raw density of less than 500 kg/m$^3$. If, as intermediate layers, no fire resistant aluminum foams or expanded glass is used, the raw density is even below 350 kg/m$^3$.

For comparison, the raw density of a particle board panel without cover plates is about 600 to 750 kg/m$^3$.

If any hardware such as panel mounting means is to be attached for example by screws, a problem arises in that the mounting means can generally be fixed only to the thin upper cover plate.

In this respect, Applicants earlier application 2009-0272065 A1 discloses an anchor which includes a clamping section which engages the upper cover plate via transverse grooves or longitudinal grooves.

It is the object of the present invention to provide an anchor with a clamping section by which the anchor can be safely and durably mounted to the lightweight construction panel in a simple manner.

SUMMARY OF THE INVENTION

In an anchor for installation in a lightweight construction panel which includes at least a cover plate, the anchor has a radial clamping section for firm engagement with the cover plate when installed in a bore formed into the construction panel. The radial clamping section comprises an upper zone provided with axial grooves and a lower zone having transversely extending grooves both in engagement with the walls of the bore in the area of the cover plate.

After its insertion into the anchor bore the anchor according is engaged in the upper cover plate because of its oversize via a longitudinally extending serration and in the lower part of the cover plate for example by means circumferentially extending webs with a transverse serration. The clamping effect is sufficient to retain the anchor in the bore in a non-rotational manner. Since at least the clamping section of the anchor consists of a tough material, the anchor is engaged in the clamping area after an attachment member is screwed or pounded into the anchor to an even greater extent by an expansion of the clamping area.

The invention will become more readily apparent from the following description of a particular embodiment thereof on the basis of the accompanying drawings.

DETAILED DESCRIPTION OF A PARTICULAR EMBODIMENT

Figure 2:
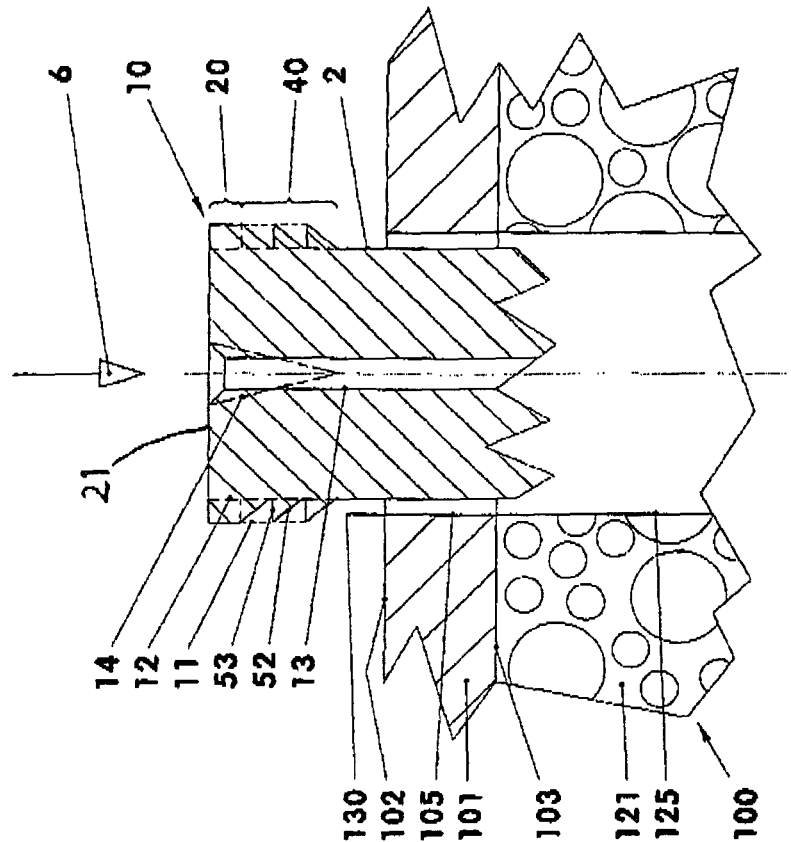
FIG. 2 shows the top part of the anchor in an axial cross-sectional view during its insertion into a light-weight construction panel.
Figure 1:
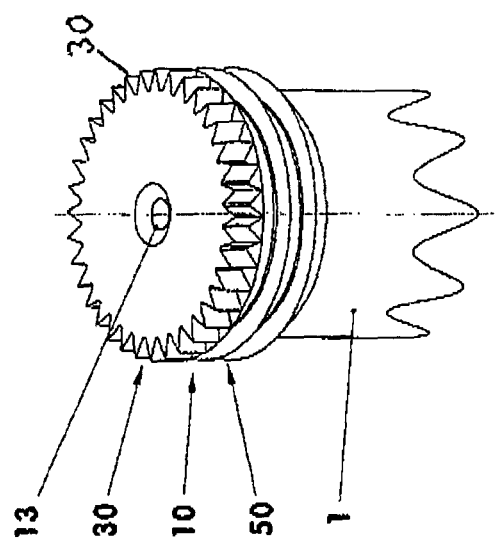
FIG. 1 is a perspective view of the top part of the anchor as seen at an angle from above.

FIG. 1 shows the clamping section (10) of an anchor (1) to be installed in a lightweight construction panel (100), see FIG. 2. The clamping section (10) is the upper part of a basic body of an anchor (1) whose outer end generally extends flash with the outer surface (102) of the upper cover plate (101) when the anchor is installed. The clamping section (10) which has for example a cylindrical outer shape is divided into two zones (20, 40) with different structures (30, 50). It includes a circumferential enveloping area (11) with axial teeth (31) and annular webs (51), which are disposed at the same distance from the centerline (5) of the anchor. The diameter of this enveloping surface area is greater than the diameter of the bore in the lightweight construction plate (100) into which the anchor is to be inserted.

The lightweight construction panel (2) as shown in FIG. 2 comprises an upper cover plate (101), a lower cover plate which is not shown and a support core (121) disposed between the upper and the lower cover plates. Each cover plate (101) consists in the shown embodiment of a thin particle board. The support core (121) in the present case is a PU foam core. The cover plates (101) are cemented with their inner surfaces (103) to the plate-like support core (121). The light-weight construction panel presented here has for example a wall thickness of 2 to 8 mm. Instead of the foam core, it may also include a honeycomb core. The lightweight construction panel is shown in the figures provided with a bore (130).

The lightweight construction panel may also be curved, that is, it may have a cylindrical or a spherical shape as long as the material thickness of the support core (121) is at least approximately constant.

For mounting the anchor, a bore is drilled into or through the upper cover plate (101) and the support core (121). As drilling tool for example, a spiral drill may be used which has a tip angle of 180°.

Also, a spot facer may be used. Depending on the type of anchor, the bore 130 may also be drilled by a stepped drill or spot facer. The bore 130 produced thereby is cleaned by blowing it out with compressed-air and/or by vacuum cleaning.

FIG. 2 shows the base body 1 of the anchor and its clamping section 10 during installation. The base body 1 in the shown embodiment is cylindrical. It has for example an outer diameter which corresponds to the base structure 12 of the clamping section 10. The base structure 12 defines an area from which the structures 30, 50 project and where they have the smallest distance from the center line 5 of the anchor.

The base body 1 has a central bore 13, which in the shown embodiment, is a cylindrical bore which, at the transition to, for example, the planar front face 21 of the zone 20 of the anchor is provided with a 45° face with the dimension 0.5× 45°. The bore 13, into which later an attachment means 80 is screwed, has a diameter of 1.3 mm. In the embodiment shown, it also serves for guiding the attachment means 80 to prevent its deviation from the centerline upon installation.

Of course, the bore or opening 13 may have any other cross-section; it may for example be oval, polygonal or star-shaped. It may also have the shape of a short straight cone 14, see FIG. 2, which is shown by dashed lines. In this case, the attachment means 80 needs to form the largest part of the support bore itself. A bore or opening 13, 14 may also be completely omitted or it may be replaced by a marking.

The front part of the base body 1 forms the clamping section 10. The first zone 20 of this clamping section 10 has a structure 30 with an axial serration. This axial serration structure has for example pointed teeth 31. In the shown embodiment, the tooth width is for example 1 mm. The base width or the teeth is about 0.7 mm. In FIG. 1, the axial serration structure 30 includes 36 teeth. The profile angles of the teeth flanks are the same at both sides. Depending on the embodiment, the number of teeth may very between 15 and 50. The serration structure has a constant pitch.

Alternatively, the structure 30 may be formed by a series of for example spherical nubs.

The second zone 40 of the clamping section 10 includes as engagement structure a transverse serration. The transverse serration comprises two to four circumferential webs 51. All webs may have the same cross-section and the same cross-sectional shape. The webs 51 may also be spaced all by the same distance.

Each web 51 has a slide flank 52 and a locking flank 53. The slide flank 52 is disposed directly adjacent the cylindrical wall 2 of the base body 1. It has the shape of a truncated cone envelope whose virtual tip is disposed on the center line 5—in accordance with FIG. 2—below the clamping section 10. The cone angle of the truncated cone envelop is in this case 80°.

At the back side of the slide flank 52, there is a planar locking flank 53. A line normal to the locking flank 53 extends parallel to the centerline 5. The slide flank 52 may also have the shape of a truncated cone envelope wherein the virtual tip of the envelope is disposed above or below the above-mentioned plane. The common circumferential edge of the slide flank 52 and the locking flank 53 defines the enveloping surface 11.

The last web 51, that is, the web directly adjacent the axial serration 30 converges directly to the axial serration 30. The locking flank 53 of this web exists only in the gaps between the teeth of the axial serration 30.

Figure 3:
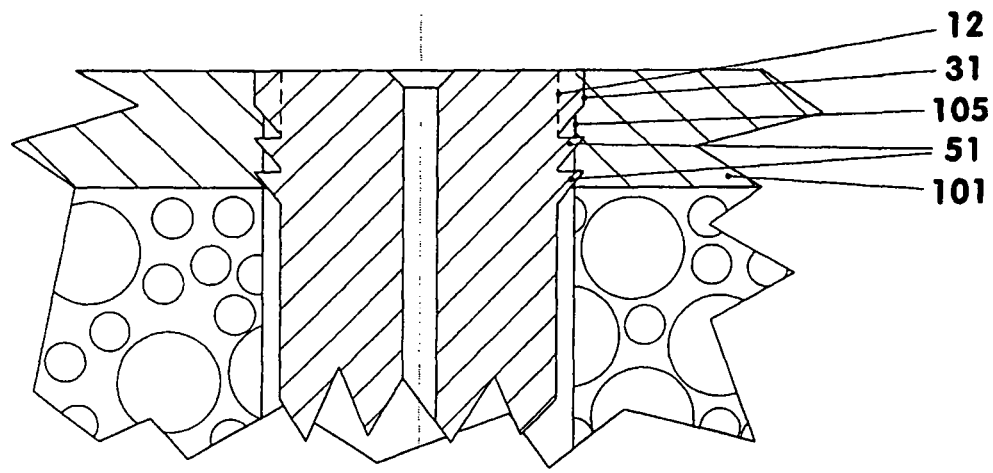
FIG. 3 is a view like FIG. 2 with the anchor fully inserted into the lightweight construction panel.

In the shown embodiment, the diameter of the enveloping Surface 11 exceeds the inner diameter of the bore 105 by 0.5 mm, see FIG. 2. When now the base body 1, that is the anchor, is inserted into the bore 130 and the clamping section 10 is pressed into the bore wall 105, the webs 51 are firmly engaged in the lower part of the cover plate 101 whereas the teeth of the axial serration 30 are engaged generally in the harder surface layer of the cover plate 101, see FIG. 3. In this area the base cylinder 12 has a smaller diameter than the bore 105 130. Still, the engagement achieved is sufficient to prevent rotation of the anchor.

The teeth 31 and/or the webs 51 may be chemically treated so as to have a larger E module than the tough-elastic core material of the clamping section 10.

The front side 21 of the clamping section 10 is arranged in the shown embodiment at least approximately in the plane of the outer surface of the cover plate 102.

Figure 4:
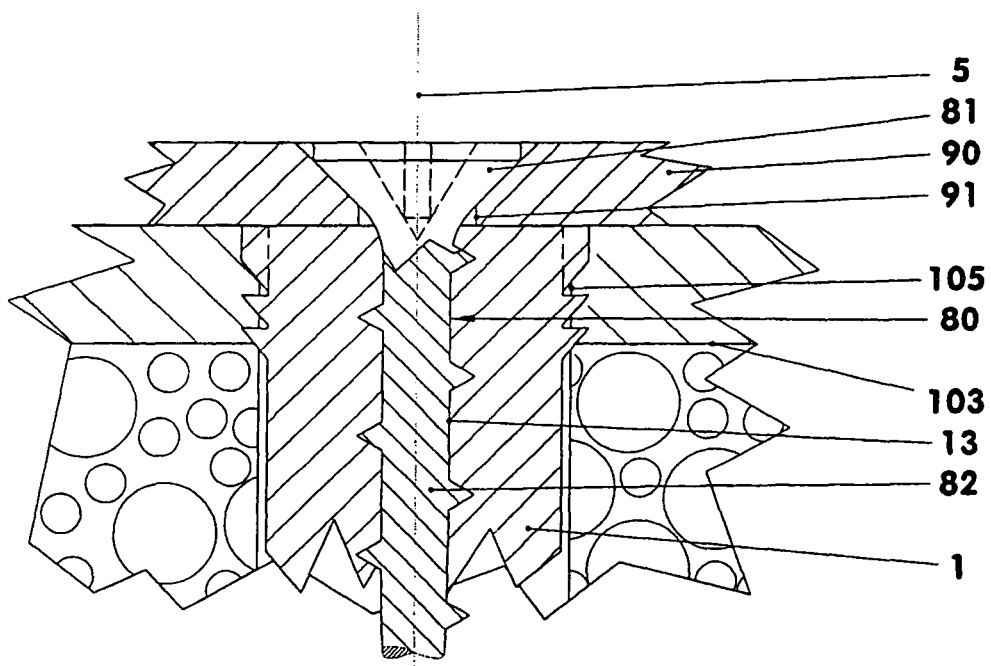
FIG. 4 is a view like FIG. 2 with some hardware attached to the lightweight construction panel.

In FIG. 4, the base body 1 and the clamping section 10 are shown with the hardware 90 mounted to the panel. The hardware 90, which is mounted via the anchor by means of a particle board screw 80, has a bore 91 with a countersink screw recess. In the bore 91, the head 81 of the particle board screw 80 is accommodated. The shaft 82 of the particle board screw 80 is disposed in the bore 13, which is now widened to at least twice the diameter of the bore 13 of the base body 1. By the expansion of the tough-elastic anchor material which consists for example of ABS, PE or PP, whose E module is below 2000 N/mm² at least the diameter of the core cylinder 12 is increased. The axial serration 30 and the transverse serration 50 are thereby embedded deeply into the wall of the bore 105. The lower area of the second zone 40 may even reach below the inner surface 103 of the cover plate 101.

| Listing of the Reference Numerals: | |
|---|---|
| 1 | Base body of the anchor |
| 2 | Wall of the base body |
| 5 | Centerline of the anchor |
| 6 | Anchor installation direction |
| 10 | Clamping section |
| 11 | Enveloping surface |
| 12 | Core cylinder |
| 13 | Center bore |
| 14 | Conical opening |
| 20 | Zone one |
| 21 | Front face |
| 30 | Axial section |
| 31 | Teeth |
| 40 | Zone two |
| 50 | Transverse serration structure |
| 51 | Webs |
| 52 | Slide flanks |
| 53 | Locking flanks |
| 80 | Mounting means, screw |
| 81 | Screw head |
| 82 | Shaft |
| 90 | Hardware |
| 91 | Bore |
| 100 | Lightweight construction plate |
| 101 | Upper cover plate |
| 102 | Outer surface |
| 103 | Inner surface |
| 105 | Bore |
| 121 | Support core |
| 125 | Bore |
| 130 | Overall bore, cavity |

What is claimed is:

1. An anchor for attachment to a lightweight construction panel (100) which includes at least one cover plate (101) of predetermined thickness, the anchor having a base body (1) with a front and a rear, end provided with an upper radial clamping section (10) having an axial length adapted to correspond to a thickness of the at least one cover plate (101) of the lightweight construction panel with which the anchor is intended to be used, the upper radial clamping section (10) of the base body (1) comprising an upper zone (20) disposed adjacent the rear end of the anchor and provided with axial grooves (30) and teeth (31), and a lower zone (40) having a transversely oriented arrangement of annular grooves (50) and at least two circumferential webs (51), with each circumferential web (51) having an axially inclined slide flank (52) and a planar locking flank (53), the axially inclined slide flanks (52) of the webs (51) forming a truncated cone-shaped surface area having a virtual tip disposed, in an axial direction (6) of the base body (1), spaced from the clamping section (10) on a center line (5) toward the front end of the anchor and at a distance providing for a cone angle of the truncated cone-shaped surface area of at least 70°, and the clamping section (10) of the anchor (1) consisting of a tough elastic material having an E modulus of less than 2000 N/mm².

2. The anchor according to claim 1, wherein the clamping section (10) of the base body (1) of the anchor includes an at least approximately central opening (13, 14) for accommodating attachment means (80) intended for an installation in the opening (13, 14), the opening having an average diameter less than half the diameter of the attachment means (80) selected for accommodation in the central opening (13, 14).

3. The anchor according to claim 1, wherein the length of the axial grooves of the clamping section (10) in a direction parallel to the centerline (5) of the anchor (1) is adapted to correspond to at least a fourth of the wall thickness of the cover plate (101) of a construction panel for which the anchor is designed, but is not less than 0.5 mm.

4. The anchor according to claim 1, wherein the clamping section has a planar front face (21).

5. The anchor according to claim 1, wherein the axial grooves (30) form a serration with individual teeth (31) which have a tooth base width of at least 0.6 mm.

6. The anchor according to claim 5, wherein the individual teeth (31) of the axial groove and tooth structure (30) have a height of at least 0.6 mm.

7. The anchor according to claim 1, wherein the locking flanks (53) of the webs (51) each have a locking surface extending normal to the center line of the anchor.

8. The anchor according to claim 1, wherein least one of the teeth (31) and webs (5) are chemically treated so as to have a larger E modulus than the tough elastic core material of the clamping section of the anchor.

\* \* \* \* \*